(12) United States Patent
Ukei et al.

(10) Patent No.: US 8,486,505 B2
(45) Date of Patent: Jul. 16, 2013

(54) PRESSURE-SENSITIVE ADHESIVE SHEET WITH RELEASE LINER

(75) Inventors: Hiroichi Ukei, Ibaraki (JP); Yoshio Nakagawa, Ibaraki (JP); Osamu Degawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 1178 days.

(21) Appl. No.: 12/043,569

(22) Filed: Mar. 6, 2008

(65) Prior Publication Data

US 2008/0220196 A1 Sep. 11, 2008

(30) Foreign Application Priority Data

Mar. 9, 2007 (JP) .................. 2007-059468

(51) Int. Cl.
*B32B 3/30* (2006.01)
*B32B 7/06* (2006.01)
*B32B 27/18* (2006.01)
*B32B 27/32* (2006.01)

(52) U.S. Cl.
USPC ........ 428/41.3; 428/40.1; 428/41.8; 428/156; 428/163; 428/167; 428/172; 428/220; 428/337; 428/500; 428/523; 524/500; 524/515; 524/528; 525/191; 525/192; 525/196; 525/240; 525/326.1; 525/333.7; 525/371

(58) Field of Classification Search
None
See application file for complete search history.

(56) References Cited

U.S. PATENT DOCUMENTS

| | | | | |
|---|---|---|---|---|
| 3,971,866 A | * | 7/1976 | Johnson | 428/41.4 |
| 4,151,344 A | * | 4/1979 | Doss et al. | 528/34 |
| 4,522,887 A | * | 6/1985 | Koebisu et al. | 428/461 |
| 4,558,147 A | * | 12/1985 | Eckberg et al. | 556/427 |
| 4,638,015 A | * | 1/1987 | Bertrand | 521/85 |
| 5,178,924 A | * | 1/1993 | Johnson et al. | 428/41.4 |
| 6,210,524 B1 | * | 4/2001 | Josephy | 156/344 |
| 6,461,706 B1 | * | 10/2002 | Freedman et al. | 428/40.1 |

(Continued)

FOREIGN PATENT DOCUMENTS

| | | |
|---|---|---|
| CN | 1471543 A | 1/2004 |
| EP | 216300 A2 * | 4/1987 |

(Continued)

OTHER PUBLICATIONS

English Abstract for JP 60203653 A, Oct. 1985.*

(Continued)

*Primary Examiner* — David Sample
*Assistant Examiner* — Jeff Vonch
(74) *Attorney, Agent, or Firm* — Leydig, Voit & Mayer, Ltd.

(57) ABSTRACT

A release liner formed of a polypropylene resin sheet that can be highly recyclable and that can provide an excellent performance in a wide range of operating temperature is provided. A release-lined pressure-sensitive adhesive (PSA) sheet constituted with the release liner is also provided. A release-lined PSA sheet 1 according to the present invention comprises a PSA sheet 20 having a support 22 and a PSA layer 24; and a release liner 10 placed on the PSA layer 24. The release liner 10 has a layered configuration formed of a layer A 12 formed of a polypropylene resin composition containing a nucleating agent; and a layer B 14 formed of a polypropylene resin composition containing no nucleating agent; wherein the two layers stacked to form the thickness of the liner.

17 Claims, 2 Drawing Sheets

U.S. PATENT DOCUMENTS

| | | | |
|---|---|---|---|
| 6,689,441 B1 * | 2/2004 | Kim | 428/40.1 |
| 6,759,110 B1 * | 7/2004 | Fleming et al. | 428/41.8 |
| 6,969,556 B2 | 11/2005 | Jeschke | |
| 8,394,478 B2 * | 3/2013 | Ukei et al. | 428/41.3 |
| 2003/0039826 A1 * | 2/2003 | Sun et al. | 428/354 |
| 2003/0077442 A1 | 4/2003 | Inokuchi et al. | |
| 2003/0152695 A1 * | 8/2003 | Sher et al. | 427/207.1 |
| 2004/0110019 A1 * | 6/2004 | Schubert et al. | 428/515 |
| 2004/0143070 A1 * | 7/2004 | Jeschke | 525/216 |
| 2004/0216833 A1 | 11/2004 | Fleming et al. | |
| 2005/0266195 A1 * | 12/2005 | Nonaka et al. | 428/40.1 |
| 2006/0019069 A1 | 1/2006 | Ikishima et al. | |
| 2008/0081143 A1 | 4/2008 | Ukei et al. | |

FOREIGN PATENT DOCUMENTS

| | | | |
|---|---|---|---|
| EP | 1 719 808 A2 | | 11/2006 |
| EP | 1 903 082 A1 | | 3/2008 |
| JP | 59-192565 A | | 10/1984 |
| JP | 60203653 A | * | 10/1985 |
| JP | 2003-127299 A | | 5/2003 |
| JP | 2004-035860 A | | 2/2004 |
| JP | 2004-506777 A | | 3/2004 |
| JP | 2006-028416 A | | 2/2006 |
| WO | WO 99/64239 A1 | | 12/1999 |
| WO | WO 02/14447 A1 | | 2/2002 |

OTHER PUBLICATIONS

Machine Translation for EP 216300 A2, Apr. 1987.*

English Translation of JP 60203653 A, Oct. 1985.*

Avalos et al., Crystallization kinetics of polypropylene: 1. Effect of small additions of low-density polyethylene, Nov. 1996, Poly vol. 37, No. 25, pp. 5681-5688.*

Long et al., Crystallization Behaviour of Isotactic Polypropylene/Linear Low Density Polyethylene Blends, 1991 (no month), Polymer International 26, pp. 143-146.*

Shanks et al., Miscibility and crystallisation of polypropylene-linear low density polyethylene blends, 2001 (no month), Polymer 42, pp. 1941-1951.*

Japanese Patent Office, Notice of Reasons for Refusal in Japanese Patent Application No. 2007-059468 (Jul. 5, 2012).

Japanese Office Action, Examiner Decision to Grant a Patent in Japanese Patent Application No. 2007-059468 (Oct. 18, 2012).

Chinese Patent Office, First Notice of the Opinion on Examination in Chinese Application No. 200810085258.0 (Jun. 18, 2012).

European Patent Office, Extended European Search Report in European Patent Application No. 08004016.5 (Jul. 8, 2008).

* cited by examiner

PRESSURE-SENSITIVE ADHESIVE SHEET WITH RELEASE LINER

BACKGROUND OF THE INVENTION

1. Field of the Invention

The present invention relates to a pressure-sensitive adhesive (PSA) sheet with release liner comprising a release liner on a PSA layer (hereinafter, referred to as "release-lined PSA sheet"). In particular, it relates to a release-lined PSA sheet that is easy to handle when removing the release liner from the PSA sheet and adhering the sheet to an adherend and the release liner is highly recyclable. The present invention also relates to a release liner for a PSA sheet which is easy to handle and highly recyclable.

The present application is filed claiming the benefit of the priority based on Japanese Patent Application No. 2007-059468 filed on Mar. 9, 2007, the entirety of which is incorporated herein by reference.

2. Description of the Related Art

As a release liner for a PSA sheet, there has been known a release liner (release paper) formed of a paper substrate laminated with a polyethylene (PE) film. Recently, to facilitate air bubble elimination at time of PSA sheet attachment, there has been developed a release-lined PSA sheet in which the release liner has a structured surface so that the PSA layer is embossed with the corresponding structure. Related art of this type of technology is described in Japanese Patent Application Publication Nos. 2004-506777 and 2006-028416. As such a release liner with a structured surface, can be preferably used the aforementioned release liner formed of a paper substrate laminated with a PE film. For example, Japanese Patent Application Publication No. 2004-506777 (paragraph 0043) discloses an example of a release liner made of a paper substrate laminated with a PE coating on both sides.

A release-lined PSA sheet in which the release liner (can be simply referred to as "liner") is constituted with a paper substrate having a PE layer on its surface is generally easy to handle because of the nature of the paper substrate. It is also advantageous because the performance is not likely to be affected by the operating temperature. However, a liner of such configuration lacks recyclability because the paper and the resin (PE) cannot be separated after use (that is, after it was removed from the PSA sheet). Moreover, a paper liner or a PSA sheet backed with the liner tends to be easily crinkled because of the surface roughness of the paper grain. This can cause unsightliness in the external appearance.

There has also been offered a no-paper liner. For example, Japanese Patent Application Publication 2004-506777, paragraph 0022, describes a liner of a polyethylene terephthalate (PET) coated (laminated) with PE having a silicone release coating, a liner of a cast polypropylene film having a silicone release coating, and the like.

Polyolefins such as PE is a resin of a different type from PET. Thus, in terms of improving the recyclability, a liner recyclable as a polyolefin material containing no other types of resin (such as PET) is desired.

SUMMARY OF THE INVENTION

As compared to a paper liner, a liner of a synthetic resin in general tends to be less flexible and less able to keep a flexed (bent) structure. Therefore, it tends to require more work when, for example, bending the liner edge away from the PSA layer to start peeling the liner off the PSA sheet, and/or when keeping the liner in a position (bent position) that does not destruct the positioning operation in which the partially exposed PSA layer is attached to a target location of an adherend. This may results in lowering handling efficiency of attaching to an adherend the release-lined PSA sheet with a liner of a synthetic resin. As compared to the paper counterpart, a liner of a synthetic resin (especially thermoplastic resin) tends to be affected by the surrounding temperature in the ease of its release from a PSA sheet. Accordingly, for example, a release condition (release position, release speed, release force, etc.) under which the liner can be smoothly released from the PSA sheet at an operating temperature of 23° C. may not consistently provide a smooth release at a high operating temperature, such as exceeding 30° C. (for instance, about 35° C.). This can result in lowering handling (operation) efficiency. Especially, when the release of the liner from the PSA sheet and the attachment of the PSA sheet take place simultaneously, there may occur problems such as jamming of the liner unless the smooth release of the liner is maintained.

An object of the present invention is to provide a release liner that is formed of a highly recyclable polypropylene resin sheet and that is easy to handle. Another object of the present invention is to provide a release-lined PSA sheet comprising such a release liner.

The present invention provides a release-lined PSA sheet, comprising: a PSA sheet having a support and a PSA layer retained by the support; and a release liner placed on the PSA layer; wherein the liner is formed of a polypropylene resin sheet. The polypropylene resin sheet has a layered configuration comprising layer A formed of a polypropylene resin composition containing a nucleating agent (composition A) and layer B formed of a polypropylene resin composition containing no nucleating agent (composition B). Hereinafter, the layer A may be referred to as a "nucleated PP layer" and the layer B as a "non-nucleated PP layer".

The release liner constituting the release-lined PSA sheet is formed of polypropylene resin compositions A and B. Therefore, it is superior to a paper liner or a liner having layers of different types of resin (for example, a release liner composed of a PET layer and a PE layer). The resin sheet has a layered configuration having a layer A (nucleated PP layer) and a layer B (non-nucleated PP layer). This leads to both facile bending of the liner and operation efficiency less dependent on the surrounding temperature. A release-lined PSA sheet comprising such a release liner can realize a fine performance (ease of attachment) because of the efficient liner release and/or the easy positioning of the PSA sheet.

The present invention provides a release liner to be put on a PSA layer of a PSA sheet. This release liner is constituted with a polypropylene resin sheet comprising a layer A (nucleated PP layer) formed of a polypropylene resin composition containing a nucleating agent (composition A) and a layer B (non-nucleated PP layer) formed of a polypropylene resin composition containing no nucleating agent (composition B). This release liner is preferred as the liner constituting the release-lined PSA sheet disclosed herein.

In a preferred embodiment of the release-lined PSA sheet or release liner disclosed herein, the side of the resin sheet that contacts the PSA layer is formed of a layer B (non-nucleated PP layer). The release-lined PSA sheet comprising such a release liner provides easy attachment (especially, easy releasing of the liner from the PSA sheet). This effect can be more pronounced when at least the surface of the liner that contacts the PSA layer is treated with a silicone release agent. As for the silicone release agent, preferably used is an addition-curable type (especially, the one containing a platinum catalyst).

In another preferred embodiment of the release-lined PSA sheet or release liner disclosed herein, at least the layer constituting the side of the resin sheet that contacts the PSA layer is formed of a polypropylene resin composition (preferably, a non-nucleated PP layer) containing none or up to 0.01 mass % of a phosphorous-containing antioxidant. The release-lined PSA sheet comprising such a release liner can provide easy attachment (especially, easy releasing of the liner from the PSA sheet). This effect can be more pronounced when the release-lined PSA sheet is constituted with a release liner of which at least the surface that contacts the PSA layer is treated with a silicone release agent. As for the silicone release agent, preferably used is an addition-curable type (especially, the one containing a platinum catalyst).

The invention disclosed herein can be adopted to a release liner that has a structured surface on the side that contacts the PSA layer. It can be applied as well to a release-lined PSA sheet comprising such a release liner. For example, the structure can be such that ridges extend in parallel to each other at a pitch of about 100 μm to 1000 μm. The height of the ridges can be, for example, about 5 μm to 50 μm.

In the release-lined PSA sheet or release liner disclosed herein, the volume of the layer A (nucleated PP layer) is preferably 50% or greater of the volume per unit square of the resin sheet. For example, the volume ratio of layer A to layer B (A:B) is preferably within a range of about 50:50 to 98:2. A liner with a larger volume of a nucleated PP layer such as these exhibits excellent heat resistance. Thus, when the resin sheet is heated, for example, in the process of release treating with a silicone release agent, deformation of the sheet by the heat (typically, thermal shrinkage) is less significant. This is especially advantageous in the release liner having a structured surface on the side that contacts the PSA layer because when such a release liner undergoes heat deformation (thermal shrinkage) by a large degree, it becomes hard to obtain a structure (peaks) with a desired form and distribution (pitch, etc.).

DETAILED DESCRIPTION OF THE INVENTION

Figure 1:
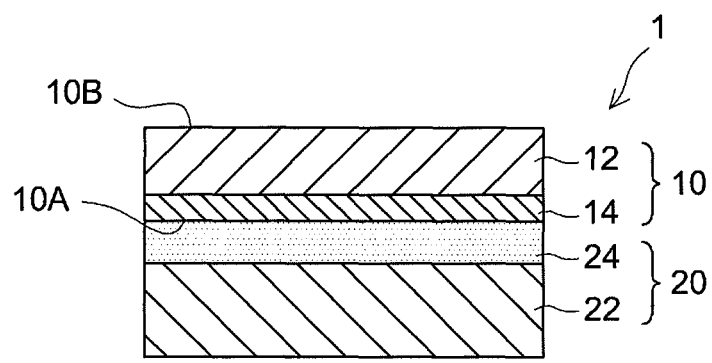
FIG. 1 shows schematically a cross section of a configuration example of the PSA sheet according to the present invention.

Hereinafter, preferred embodiments according to the present invention will be described. The matter which is other than that specifically referred to in this specification, but is necessary for carrying out the present invention, may be understood as a matter of design choice for those skilled in the art based on the conventional art. The present invention can be carried out based on the contents disclosed in this specification and the technological common knowledge in the art.

The release-lined PSA sheet disclosed herein comprises a PSA sheet having a PSA layer, and a liner placed on the PSA layer.

A PSA sheet constructing such a release-lined PSA sheet comprises a support and a PSA layer retained by the support. The PSA sheet may have a PSA layer on one or both surfaces of the support (substrate). In this specification, the concept of "PSA sheet" may encompass so-called PSA tape, PSA label, PSA film and the like. The PSA layer does not need to be continuous, but may be in a pattern of, for example, regularly or randomly arranged dots, stripes, or the like.

The liner (release liner) constructing the release-lined PSA sheet is substantially formed of a polypropylene resin sheet (hereinafter, occasionally referred to as a "PP sheet"), which is obtained by molding at least two different polypropylene resin compositions (hereinafter, occasionally referred to as "PP compositions") into a sheet. The PP sheet has a layered configuration in which a layer A formed of a nucleated PP composition (composition A) and a layer B formed of a non-nucleated PP composition (composition B) are laminated to form the thickness of the sheet. A PP sheet obtained by molding only a nucleated PP composition(s) into a sheet (for instance, a PP sheet consisting of a layer A alone) exhibits a greater rigidity and heat resistance as compared to a PP sheet obtained by molding only a non-nucleated PP composition(s) (for, example, a PP sheet consisting only of a layer B). The increased heat resistance is advantageous in terms, for example, that increasing the surrounding temperature from room temperature (typically, around 23° C.) to a higher temperature does not significantly affect the bending strength and that the degree of thermal shrinkage of the sheet is small when heated in the release-coating process or the like (for instance, heated to about 145° C.). On the other hand, in terms of PP-sheet bending ease, the rigidity of the sheet is preferred not too high. By having a configuration in which a nucleated PP layer (layer A) and non-nucleated PP layer (layer B) are laminated as described above, the liner disclosed herein can realize the two opposing properties of great heat resistance and bending ease in a good balance at a high level.

In this specification, the term "polypropylene resin composition (PP composition)" refers to a composition whose base polymer (main component among the polymer components) is a propylene polymer of which the main monomer (main monomer component) is propylene. The concept of "propylene polymer" may encompass both a homopolymer of propylene (homopolypropylene, typically an isotactic polypropylene) and a copolymer of propylene and another monomer(s) (e.g., one, two or more kinds selected from α-olefins having 2 or 4 to 10 carbon atoms). The copolymer may be a random copolymer (random polypropylene) or a block copolymer. It may also be a polypropylene resin composition containing, at an arbitrary ratio, two or more kinds of propylene polymers (e.g., a combination of a homopolypropylene and a random polypropylene, a combination of two kinds of random polypropylenes obtained from different copolymer compositions, etc.).

Each of the PP compositions A and B may contain as a secondary component, if needed, a polymer component other than the propylene polymer (base polymer). Such a secondary polymer component may be any of various polymers miscible or immiscible with the propylene polymer. The secondary polymer content (when two or more secondary polymer components are contained, their total content) may be within a range of, for example, 70 parts by mass or less (typically, 0.1 to 70 parts by mass), preferably 50 parts by mass or less (typically, 0.1 to 50 parts by mass), and more preferably 20 parts by mass or less (typically, 0.1 to 20 parts by mass), with respect to 100 parts by mass of the propylene polymer. The secondary polymer content may be 5 parts by mass or less (typically, 0.1 to 5 parts by mass) with respect to 100 parts by mass of the propylene polymer. Or the PP composition may contain no secondary polymer component (i.e., the polymer component consists only of one, two or more kinds of propylene polymers).

In a PP composition containing a secondary polymer component, the secondary polymer component is preferably a polymer recyclable as a polyolefin material together with the propylene polymer (i.e., without separating the secondary polymer component from the propylene polymer). For example, preferable is an olefin polymer composed mainly of an ethylene or an α-olefin having 4 or more carbon atoms (typically, an ethylene polymer). Here, the concept of "ethylene polymer" may encompass a homopolymer of ethylene, a copolymer of ethylene and another monomer(s) (e.g., one, two or more kinds selected from α-olefins having 3 to 10 carbon atoms), and the like. Hence, the concept of "ethylene polymer" may encompass so-called a low density polyethylene (LDPE), linear low density polyethylene (LLDPE), high density polyethylene (HDPE), and the like.

In one preferable embodiment of the release liner disclosed herein, the PP composition contains an ethylene polymer (e.g., a LDPE, typically, a linear LDPE) as the secondary polymer component in addition to the propylene polymer (e.g., a homopolypropylene). The ethylene polymer content may be, for example, about 1 to 50 parts by mass (preferably about 5 to 20 parts by mass) with respect to 100 parts by mass of the propylene polymer.

In another preferable embodiment, the PP composition contains essentially no polymer component other than the propylene polymer and the aforementioned olefin polymer (typically, an ethylene polymer). A release liner formed of such a PP composition is especially excellent in recyclability (e.g., recyclability as a polyolefin material).

As the nucleating agent for a nucleated PP composition A, can be used various substances that exhibit nucleating activity toward polyolefins (e.g., polypropylene resin). For example, the following substances are preferably used as the nucleating agent:

a compound represented by the following formula 1 (aluminum hydroxy-di-p-tert-butylbenzoate):

[Chemical formula 1]

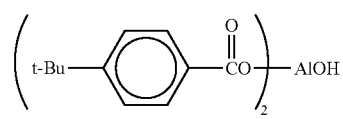

(1)

a compound represented by the following formula 2 (sodium 2,2-methylene-bis-(4,6-di-tert-butylphenyl) phosphate):

[Chemical formula 2]

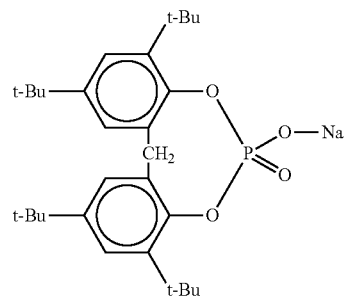

(2)

a phosphate ester salt represented by the following formula 3:

[Chemical formula 3]

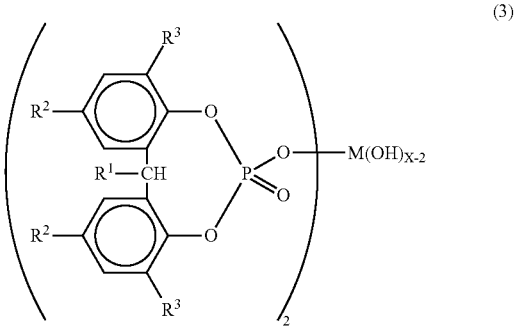

(3)

wherein $R^1$ is a hydrogen atom or an alkyl group having 1 to 4 carbon atoms, $R^2$ and $R^3$ are each independently any one selected from a hydrogen atom and alkyl groups having 1 to 12 carbon atoms (e.g., a tert-butyl group), M is a metal atom belonging to group III or IV of the periodic table; and X is a valence of the metal M;

and, a sorbitol compound represented by the following formula 4:

[Chemical formula 4]

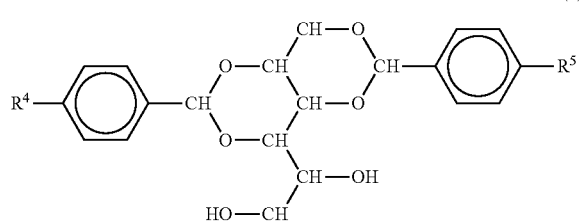

(4)

wherein $R^4$ and $R^5$ are each independently any one selected from a hydrogen atom and alkyl groups having 1 to 5 carbon atoms.

In addition to the above, a metal salt of a rosin, for example, can be used as the nucleating agent.

One of these nucleating agents may be used alone or two or more of these can be used in combination. The mixing ratio of the nucleating agent in the PP composition A used for preparing the liner disclosed herein may be, for example, about 0.01 to 3 parts by mass (preferably, 0.02 to 2 parts by mass) with respect to 100 parts by mass of the propylene polymer (when two or more propylene polymers are contained, their total mass) contained in the PP composition A. As the PP composition A in the present invention, can be used preferably a PP composition, comprising at an appropriate ratio, a propylene polymer (e.g., a homopolypropylene) containing a nucleating agent at the ratio described above; and an ethylene polymer (e.g., a LDPE).

Each of the PP compositions A and B may contain, as needed, any of various components generally known as additives and used for polyolefin resin compositions as long as the effects of the present invention are not significantly spoiled. Examples of such components include antioxidant, neutralizer, thermostabilizer, photostabilizer, ultraviolet absorber, antistatic agent, slip agent, anti-blocking agent, colorant (pigment, dye, etc.) and the like. For example, the PP composition may contain a pigment such as $TiO_2$ or the like at a ratio of about 5 to 20 parts by mass with respect to 100 parts by mass of the propylene polymer. As for the antioxidant, can be used appropriately one or two or more selected from conventionally known various antioxidants including phosphorus-containing antioxidants (phosphite-containing) such as tris(2,4-di-tert-butylphenyl)phosphite, tris(nonylphenyl)phosphite, triphenylphosphite, di-stearyl-pentaerythritol diphosphite and the like; sulfur-containing antioxidants; phenol-containing antioxidants; amine antioxidants; and the like.

In a typical embodiment of the liner disclosed herein, the PP sheet constituting the liner is coated (release treated) with a release agent at least on the surface (PSA facing surface) that contacts the PSA layer (the liner face that is placed on the PSA layer). The release treating (coating) may be the same as the release treating applied to a conventional release liner on its PSA facing surface. For example, various conventional release agents can be applied to a surface of a pre-molded PP sheet. These release agents can be silicone-based, fluorine-based, long-chained alkyl-based, fatty acid amide-based, silica powder and so on. Furthermore, the surface of the PP sheet that does not contact the PSA layer may be coated with a release agent that is the same or different from the one used on the PSA facing surface. The concept of "release liner formed of a PP sheet" encompasses a release liner composed of a PP sheet coated with a release agent in this way as well.

Silicone release agent is a preferred example of the release agent used for release coating in the present invention. For example, a heat-curable silicone release agent can be used preferably. As the heat-curable silicone release agent, an addition-curable silicone release agent is especially preferable though both addition-curable and condensation-curable types are usable. Generally, in these types of release agents, a platinum (Pt) or rhodium (Rh) catalyst is used to catalyze the curing process. In terms of such as curing efficiency, a platinum catalyst is usually preferred.

The PP sheet constituting the release liner disclosed herein comprises at least one layer A (nucleated layer) and one layer B (non-nucleated layer). The PP sheet may include more than two layers of either one or the both of layers A and B. When more than two layers A are contained, their compositions can be the same or different. For example, two layers A each containing an antioxidant at a different fraction can be laminated. The same is true with a configuration having two or more layers B. Usually, in terms of such as production ease, preferably used is a PP sheet having a two-layer configuration in which one layer A and one layer B are laminated.

Placement and order of layers A and B are not specifically restricted. For example, either of layers A and B can be placed on the PSA side (on the side that contacts the PSA sheet) in a two-layer PP sheet in which one layer A and one layer B are laminated. A PP sheet with a layer B (non-nucleated layer) placed on the PSA side can be preferably used and this configuration is especially preferred for a release liner that is coated with an addition-curable silicone release agent (typically having a platinum catalyst as the curing catalyst) on the PSA side of the PP sheet. This is because when an addition-curable silicone release agent is applied to the surface of a layer formed of a PP composition containing a nucleating agent, curing of the release agent can be inhibited depending on the kind and amount of the nucleating agent used. Inhibition of curing of the silicone release agent may hinder the releasing ability inherent to the release agent (the ability to lower the peel strength of the liner). By placing the non-nucleated layer (layer B) on the PSA side, the curing process becomes less affected by the kind and amount of the nucleating agent as well as the kind of the release agent used, and thus the release agent can be cured appropriately. Hence, the composition of layer A and the choice of release agents are less limited.

At least the layer on the PSA side (i.e., the layer to be placed closest to the PSA side, typically the layer contacts the PSA layer) of the PP sheet is preferably formed of a PP composition with about 0.01 mass % (typically, 0.001-0.01 mass %) or less or none of a phosphorous-containing antioxidant. This composition is especially preferred for a release liner that is coated on the PSA facing surface of the PP sheet with an addition-curable silicone release agent (typically having a platinum catalyst as the curing catalyst). This is because a phosphorous-containing antioxidant may inhibit curing of the release agent when an addition-curable silicone release agent is applied to the surface of a layer formed of a PP composition containing a phosphorous-containing antioxidant at a fraction greater than the above range. In order to avoid such inhibition of curing, at least the layer on the PSA side of the PP sheet preferably contains about 0.01 mass % (typically, 0.001-0.01 mass %) or less of phosphorous-containing antioxidants, sulfur-containing antioxidants, and amine anitioxidants in total or free from any of these antioxidants. For instance, preferred is a PP sheet of which the PSA side has a layer formed of a PP composition, comprising a propylene polymer containing a phosphorous-containing antioxidant at a fraction within the above range and further containing a phenol-containing antioxidant; and equally preferred is a PP sheet of which the PSA side has a layer formed of a PP composition, comprising this propylene polymer and an ethylene polymer (e.g., LDPE) at an appropriate ratio.

The volume ratio of layer A to layer B (in a typical case, essentially the volume ratio between the used amounts of compositions A and B) can be set appropriately to realize the desired effects (for example, heat resistance and bending ease in balance). For example, the volume ratio of layer A to layer B (A:B) can be 2:98 to 98:2. In order to obtain better effects of the embodiment disclosed herein, the volume ratio may be 5:95 to 95:5 and more preferably 10:90 to 90:10. More desirable performance (e.g., greater heat resistance) can be obtained when the ratio of layer A to layer B (A:B) is 50:50 to 98:2 (more preferably, 70:30 to 95:5).

The PP sheet may be smooth on both sides (the two surfaces defining the thickness) or may have a structured surface on one or both sides. In a preferred embodiment, the PP sheet is structured on at least the PSA side (the side to be placed on a PSA layer). The pattern of the structure may or may not be regular (typically, regular). The surface on the PSA side may have the structure across the entire area or in part (for instance, in an area bound by a partial width and/or a partial length). The PP sheet may be smooth on the non-PSA side (the side that does not contact the PSA layer) or may be furnished entirely or partially with a structure that is the same or different from that on the PSA side.

The structure on the PSA side, for example, may be a plurality of peaks (ridges) extending in parallel to each other at a predetermined pitch (interval between adjacent ridges). It may have a first group of ridges extending in parallel to each other in one direction and a second group of ridges extending in parallel to each other in a direction intersecting (typically, intersecting perpendicularly) the direction formed by the first group. It may have a third, fourth or more groups of ridges. When a release liner formed of a PP sheet having such a structure on the PSA side is used to constitute a release-lined PSA sheet, the structure is transferred onto the PSA layer. This provides the PSA sheet with good air elimination ability. Alternatively, a PSA layer formed on a release liner with a structured surface may be transferred to a support to prepare a PSA sheet with good air elimination ability.

The cross section of each ridge (the cross section taken perpendicular to the extending ridge) constituting the group of ridges may be, for example, rectangular, trapezoidal (typically, the upper side is shorter than the lower side), inverted V-shaped, inverted U-shaped, semicircular or the like. The height of the ridge may be, for example, about 5 μm to 50 μm. The width of the ridge (typically, the width of the bottom of the ridge) may be, for example, about 10 μm to 200 μm (preferably, about 15 μm to 35 μm). The cross section (height, width, etc.) of each ridge may or may not be uniform. For instance, the cross section of each ridge may be mostly uniform or ridges with non-uniform cross sections may be distributed regularly or randomly as well. The pitch of the peaks (ridges) in a group may be, for example, about 100 μm to 1000 μm. When a plurality of ridge groups extend in directions intersecting each other, the cross section of the ridges within each group may or may not be uniform. The pitch of the ridges within each group may or may not be constant.

In one preferable embodiment, the entire surface of the PSA side of the PP sheet has a first and second groups of ridges intersecting perpendicularly to each other. The ridges of the same group have a common cross section and the ridges of the first group and the ridges of the second group share a common cross section as well. The cross section is generally trapezoidal with the upper side being shorter than the lower side. In particular, for example, the height may be about 5 μm to 30 μm, the length of the lower side may be about 40 μm to 80 μm, and the length of the upper side may be about 3 μm to 60 μm (but shorter than the lower side). The pitch of the ridges of the first group is approximately the same (typically, the same) as the pitch of the ridges of the second group. The pitch is preferably about 100 μm to 1000 μm (e.g., about 400 μm to 600 μm). When used to constitute a release-lined PSA sheet, a release liner having such a structured surface provides excellent air elimination ability. A PSA layer formed on a release liner of such a configuration can be transferred to a support to produce a PSA sheet with especially good air elimination ability as well.

Not especially limited to, but the thickness of the PP sheet may be, for example, about 50 μm to 500 μm. The thickness may be about 50 μm to 300 μm. For a consistent peeling ease (especially, peeling ease in a high temperature environment), the thickness of the sheet is preferably about 100 μm to 300 μm, and more preferably about 150 μm to 250 μm. In a PP sheet having ridges at least on the surface of the PSA side as described above, the thickness measured from the tip of the ridge (i.e., the thickness including the ridge) is preferably about 500 μm or less (preferably about 250 μm or less, more preferably about 200 μm or less, but typically about 100 μm or greater). The thickness excluding the ridge is preferably about 50 μm or greater (preferably about 100 μm or greater, but typically 180 μm or less).

In one preferred embodiment of the liner disclosed herein, the liner has a structured surface on the PSA side and is formed of a PP sheet comprising a structured layer constituting the PSA side and a support layer backing the structured layer. For example, preferred is a liner in which the structured layer is a layer B (non-nucleated PP layer) and the support layer is a layer A.

There is no specific limitation on the method for producing a PP sheet of a layered configuration from the PP compositions A and B, and can be appropriately used any conventionally known method for producing a polyolefin resin sheet (e.g., PP sheet). According to one preferable method, the PP compositions A and B are adjacently extruded in melted states to form ribbons, fed between rolls to be cooled and molded into a sheet (melt extrusion method).

Figure 3:
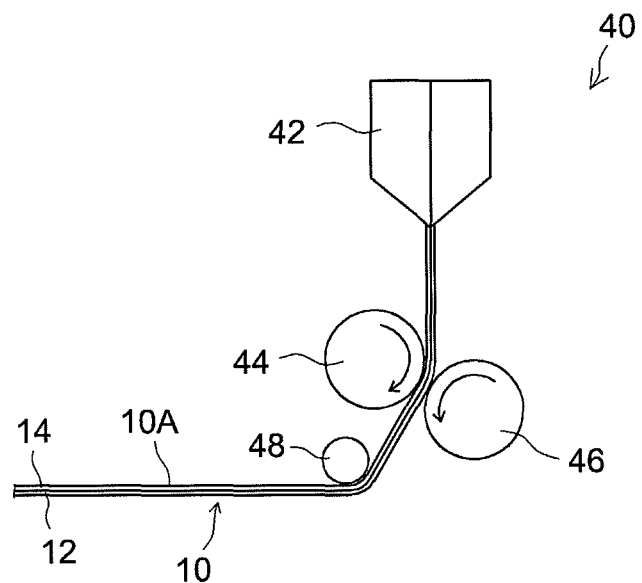
FIG. 3 shows schematically a configuration example of a sheet-molding apparatus.

A typical embodiment of the method is described with reference to FIG. 3. A sheet forming (molding) apparatus 40 shown in FIG. 3 roughly includes an extrusion-molding machine having a T-die 42, and a pair of cooling rolls 44 and 46 facing each other. The T-die 42 is equipped with a first opening to extrude a PP composition A and a second opening next to the first to extrude a PP composition B. The PP compositions A and B are placed separately in the extrusion-molding machine and heated to melt at a predetermined temperature. The melted PP compositions A and B are extruded through the openings of the T-die 42 to form ribbons in parallel. While being fed between the cooling rolls 44 and 46, the extruded PP compositions A and B are cooled and solidify into a two-layer sheet 10, comprising a layer A 12 formed of the composition A and a layer B 14 formed of the composition B. The surfaces of the PP sheet 10 reflect the surface structures of the rolls 44 and 46. The PP sheet 10 discharged from the cooling rolls 44 and 46 is guided to a take-up roll (not shown) via a pulling roll 48. The elongated PP sheet 10 is thus formed of the PP compositions A and B.

By using, for example, a roll having a structure on its surface as the cooling roll 44, the structure is reflected (transferred) on a surface 10A, the surface of the PP sheet 10 on the side of the cooling roll 44. Thus can be formed the PP sheet 10 having a structured layer 14 and support layer 12. For example, for the PP sheet to be such that the surface 10A has a first group of ridges and a second group of ridges at a predetermined pitch (interval between adjacent ridges) intersecting perpendicularly to each other, the cooling roll 44 should have a surface structure composed of a first group of grooves and a second group of grooves at the predetermined pitch corresponding to the groups of ridges.

There is no limitation to the method for providing the surface of the PP sheet with a structure and any appropriate method can be applied. For instance, after it is solidified, the PP sheet may be heat-pressed with a pattern so that the surface of the PP sheet is embossed with the pattern. Or the PP sheet can be treated on the surface with a laser beam. Two or more of these methods can be used in combination.

Figure 2:
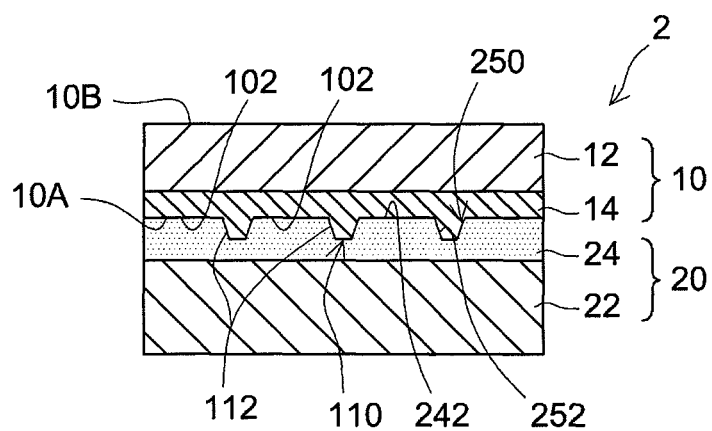
FIG. 2 shows schematically a cross section of another configuration example of the PSA sheet according to the present invention.

A release-lined PSA sheet disclosed herein may have, for example, a cross section as schematically shown in FIG. 1 or FIG. 2. Among FIGS. 1 and 2, the elements having a similar function are assigned a common reference numeral.

A release-lined PSA sheet 1 shown in FIG. 1 comprises a PSA sheet 20, which includes a support 22 and a PSA layer 24 on one surface of the support 22, and further comprises a release liner 10 placed on the PSA layer 24. The liner 10 is formed of a two-layer PP sheet in which a layer A 12 formed of a nucleated PP composition A and a layer B 14 formed of a non-nucleated PP composition B are laminated. The layer B 14 is on the PSA side. In one preferable embodiment, a surface 10A (release surface) on the PSA side of the liner 10 is coated with a release agent. A surface (back surface) 10B opposite from the PSA side may or may not be coated with a release agent. In the release-lined PSA sheet 1 shown in FIG. 1, the surface 10A on the PSA side of the liner 10 is smooth (flat). Peeling the liner 10 from the PSA sheet 20 exposes the smooth PSA layer 24 reflecting the structure of the surface 10A on the PSA side. By pressing the PSA layer 24 onto an adherend, the PSA sheet 20 is attached to the adherend.

A release-lined PSA sheet 2 as shown in FIG. 2 has, on the PSA side surface 10A of the liner 10, a plurality of ridges 112 extending in parallel to each other in one direction and distributed at a predetermined pitch. The PSA side surface 10A has also a plurality of ridges (not shown) extending in the direction perpendicular to the direction of the ridges 112 and distributed at a predetermined pitch (typically, the same pitch as the ridges 112). Thus, a lattice-like structure 110 is formed over the PSA side surface 10A. Each square surrounded (bounded) by the ridges 112 in the structure 110 is a relatively recessed flat surface 102. The structure 110 including its base part forms a layer B (structured layer) 14 and a layer (support layer) 12 is placed thereon.

On the other hand, corresponding to the surface 10A, the surface of the PSA layer 24 facing the surface 10A displays grooves 252 and grooves (not shown) extending perpendicularly to the grooves 252. The two sets of the grooves thus intersect each other to form a grooved lattice 250. Each square surrounded by the grooves of the grooved lattice 250 is a relatively protruding flat surface 242. The rest of the configuration is essentially the same as that of the release-lined PSA sheet 1 shown in FIG. 1. Peeling the liner 10 from the PSA sheet 20 exposes the PSA layer 24 having a grooved lattice corresponding to the structure of the PSA side surface 10A. By pressing the PSA layer 24 onto an adherend with an appropriate force, the flat surface 242 is adhered to the adherend while air channels are left between the grooved lattice 250 and the adherend. Through these channels, can be eliminated air bubbles trapped at time of attaching the PSA sheet 20.

In accordance with the application purposes of the PSA sheet, an appropriate support can be selected from the following materials: plastic films such as polypropylene film, ethylene-propylene copolymer film, polyester film, polyvinyl chloride film and the like; foam substrates such as polyurethane foam, polyethylene foam and the like; paper such as kraft paper, crepe paper, rice paper ("washi") and the like; fabrics such as cotton cloth, staple fiber cloth and the like; unwoven fabrics such as polyester unwoven cloth, vinylon unwoven cloth and the like; and metal foils such as aluminum foil, copper foil and the like. As the plastic film, either unstretched film or stretched (monoaxially or biaxially stretched) film may be used. Surface treatment such as undercoating, corona discharge or the like may be applied to the support surface to retain the PSA layer. The thickness of the support may be appropriately selected in accordance with the purpose, but generally about 10 μm to 500 μm (typically, 10 μm to 200 μm).

There is no specific limitation on the type of PSA for the PSA layer. The PSA layer may contain one, two or more selected from various conventionally known PSAs which are, for example, acrylic, polyester-based, urethane-based, polyether-based, rubber-based, silicone-based, polyamide-based, and fluorine-based and so on. The form of the PSA is not limited, either, and can be used various forms of PSA, such as a solvent type, emulsion type, water-soluble type, ultraviolet-curable type and the like. These PSAs may contain one, two or more of general additives such as tackifier, viscosity modifier, leveling agent, plasticizer, filler, colorant such as pigments, dyes or the like, stabilizer, preservative, anti-aging agent, antistatic, and the like.

In one preferable embodiment, the PSA layer is formed of an acrylic PSA containing an acrylic polymer as the base polymer (main component of the polymer contained in the PSA). The acrylic polymer is typically a (co)polymer containing, as a main monomer, alkyl(meth)acrylate, i.e., a (meth)acrylic acid ester of alkylalcohol. Herein, the term "(meth)acrylic acid" refers to both "acrylic acid" and "methacrylic acid". A preferable PSA layer contains, for example, an acrylic PSA composed mainly of an acrylic polymer comprising a (meth)acrylic acid ester of an alkylalcohol as the main monomer, wherein the alkylalcohol has 2 to 14 carbon atoms (more preferably 4 to 10 carbon atoms). Such a PSA layer may be formed of, for example, an acrylic PSA composition containing an acrylic polymer comprising the abovementioned (co)polymer and optionally containing additives such as tackifier, cross-linking agent, solvent and the like.

Not especially limited to, the thickness of the PSA layer may be, for example, in a range of about 5 μm to 150 μm (typically, about 10 μm to 100 μm). In the release-lined PSA sheet comprising a PSA layer and a liner of which the PSA side surface is structured, it is preferable that the thickness of the PSA layer is approximately equal to or greater than the height of the ridges on the liner surface (the distance from the tip of the ridge to the bottom the groove).

The PSA layer may be formed by, for example, directly applying (typically by coating) an appropriate PSA composition to the support and optionally, drying and/or curing the composition (direct method). Then, the release liner is laminated on the PSA layer, thereby forming a release-lined PSA sheet. Alternatively, the PSA composition may be applied to the release liner to form a PSA layer on the release liner, and a support can be placed over the PSA layer to form the release-lined PSA sheet (transfer method). Similarly, in the case of a release-lined PSA sheet that includes a PSA sheet and a liner having a structured surface on the PSA side, by forming a smooth PSA layer on the support, and placing the supported PSA layer on the liner, and optionally pressing, the structure on the surface of the liner can be reflected on the PSA layer. Alternatively, the PSA layer may be formed on the liner having a structured surface (on the PSA layer side surface) and then the PSA layer may be transferred to (placed onto) the support.

EXAMPLES

Hereinafter, some examples according to the present invention will be described, but the present invention is not limited to these examples. In the following description, the "part(s)" and "%" are based on mass unless otherwise specified.

Table 1 refers to polypropylene resins (PP resins) used in preparation of the release liners (samples 1 to 6) described hereafter.

TABLE 1

|  | Nucleating agent | Phosphorous-containing antioxidant content |
|---|---|---|
| PP resin 1 | contained | 0.08% |
| PP resin 2 | not contained | 0.08% |
| PP resin 3 | not contained | 0.04% |
| PP resin 4 | not contained | 0.005% |

For the PP resins 1, 2, 3 and 4, were used trade names "Novatec PP FY6C," "Novatec PP FY6," "Novatec PP FY4"

and "Novatec PP FB3C," respectively, which are all homopolypropylene resins available from Japan Polypropylene Corporation.

The amount of phosphorous-containing antioxidant shown in Table 1 was determined by quantitative analysis of each of the PP resins as follows: 0.5 g of each sample (PP resin) was weighed out and to this was added 10 mL of xylene. The resulting mixture was heated to melt and extracted with 80 mL of acetonitrile to obtain phosphorous-containing antioxidant. The acetonitrile layer was concentrated and the remaining residue was diluted with acetonitrile to a volume of 10 mL and filtered through a membrane filter of 0.45 μm in pore diameter. The filtrate was analyzed with HPLC (high performance liquid chromatography) to determine the amount of the phosphorous-containing antioxidant in each sample. For the HPLC analysis, Alliance (trademark) PDA system available from Waters Corporation was used at the following condition:

Column: Waters Xterra MS C18
Column size: 4.6 mm φ×150 mm
Column temperature: 40° C.
Sample amount: 10 μL
Flow rate: 1.0 mL/min
Detector: PDA (photodiode array)

Each sample was analyzed for other properties as follows:

Thickness and Structure

The total thickness of each sample was measured using a dial gage with a lower reading limit of 1/1000 mm.

The thickness of the support layer of each sample was determined by observing the cross section showing the thickness under a field emission scanning electron microscope (trade name "S-4800," a FE-SEM available from Hitachi High-Technologies Corporation) at 300 times magnification.

The surface structure of the sample was analyzed by observing the surface under a confocal laser scanning microscope (trade name "LEXT OLS3000" available from Olympus Corporation).

Bending Strength

Figure 4:
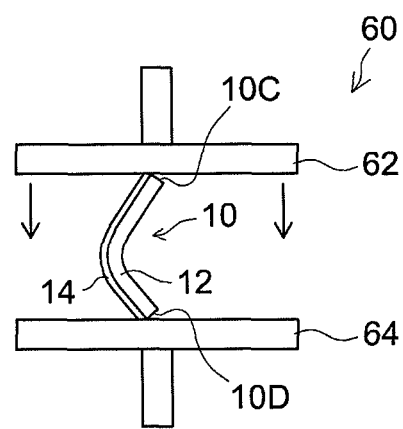
FIG. 4 illustrates schematically a method for measuring bending strength.

The bending strength of each sample was determined using an apparatus 60 as shown schematically in FIG. 4 (trade name "TECHNO GRAPH TG-5kN," a tensile and compression testing machine available from Minebea Co., Ltd.).

Each sample was cut into a strip of 50 mm width and 100 mm length to prepare a test piece 10. The linearly-extended test piece (liner) 10 was held vertically between the upper plate 62 and the lower plate 64 of the apparatus 60. While the lower plate 64 was kept at a fixed position, the upper plate 62 was moved (lowered) toward the lower plate 64 at a rate of 300 mm/min until the distance between the two plates was 5 mm (in other words, the distance traveled by the upper plate 62 from the initial position was 95 mm. Thus, as shown in FIG. 4, two ends 10C and 10D of the test piece were brought closer to each other so that the test piece 10 gradually assumed a U-shape with the structured layer 14 on the outer curve. The compressive force (bending strain) applied to the test piece 10 until the upper plate 62 was moved by 90 mm from the initial position was determined from a chart showing the relationship between the distance traveled by the upper plate 62 and the compressive force. This compressive force was defined as the bending strength of the sample at 90 mm distance (N/50-mm). The bending strength was measured at temperatures of 5° C., 23° C. and 35° C.

Crease Retention

Each sample was cut into a strip of 50 mm width and 100 mm length to prepare a test piece. At a temperature of 23° C., the test piece was folded along the center width line so that the structured layer was on the outside. The crease (close end) was lightly pressed by hand and then released. The state of the test piece was observed and evaluated as follows:

3: The test piece stayed folded after released (excellent crease retention).

2: The test piece sprung back partially to the original state.

1: The test piece sprung back mostly to the original state (essentially no crease retention).

Heat Resistance During Release Coating

The structured surface of each PP sheet (liner substrate) was coated with a predetermined silicone release agent. The resulting coated sheet was heated at 145° C. for one minute. The thermal shrinkage (the widthwise shrinkage) of the sample was evaluated in relation to the original dimensions of the PP sheet.

≦4%: The widthwise shrinkage was 4% or less (excellent heat resistance).

>4%: The widthwise shrinkage was greater than 4%.

Peel Strength of Liner

A PP sheet of a 90 μm thickness was prepared as the support for each PSA sheet. An acrylic PSA (a 2-ethylhexylacrylate-based solvent-type PSA available from Nitto Denko Corporation) was applied to one face of the support and dried at 100° C. for one minute to form a PSA layer of an about 35 μm thickness (after dried). The obtained PSA layer on the PSA sheet was placed on a release liner (each liner sample) and the sheet and the liner were pressed together by applying a force of 0.4 N/mm² at a temperature of 23° C. for five minutes to prepare a release-lined PSA sheet.

Each release-lined PSA sheet was cut into a strip of 50 mm width and 100 mm length to prepare a test piece. The test piece was analyzed for its lengthwise peeling strength of the liner in N/50 mm using a high speed release tester (a product of Koken Corporation). The testing was carried out at a release angle of 90° and at a peeling speed of 1 mm/min (low speed release) or 48 m/min (high speed release). The peel strength was measured at operating temperatures (surrounding temperature) of 5° C., 23° C. and 35° C.

Releasing Ease

Each release-lined PSA sheet was cut into a strip of 50 mm width and 100 mm length to prepare a test piece. At a temperature of 23° C., the liner of the test piece was bent at one corner toward the back (the side not in contact with the PSA sheet) and the release of the PSA sheet upon bending of the liner was evaluated as follows:

3: Upon liner bending, the PSA sheet was sufficiently released from the liner.

2: Upon liner bending, the PSA sheet was partially released from the liner.

1: Upon liner bending, the PSA sheet was not released from the liner (no separation).

Silicone Curing Efficiency

Using an X-ray fluorescence spectrometer (trade name "ZSX100e" available from Rigaku Corporation), the amount of silicon (Si) present on the release-coated surface of each sample. From the amount of Si, the dimethylsiloxane-standard mass was determined in g/m² and defined as the amount of the applied release agent. Further, the liner was released from the release-lined PSA sheet to expose the PSA layer. The exposed PSA layer was analyzed for the amount of Si in a similar manner. From the Si content, the dimethylsiloxane-standard mass was determined in mg/m² and defined as the amount of silicone transferred into the PSA layer. The less the amount of the transferred silicone with respect to the amount of the applied release agent, the better the curing of the release agent. Thus this ratio was defined as the curing ability of silicone and each sample was evaluated as follows:

3: The amount of the transferred silicone is less than 0.2% of the amount of the applied release agent.

2: The amount of the transferred silicone is 0.2% or greater, but less than 0.3% of the amount of the applied release agent.

1: The amount of the transferred silicone is 0.3% or greater of the amount of the applied release agent.

Example 1

Preparation of Release Liner Sample 1

100 parts PP resin 1 and 10 parts linear low-density polyethylene (LDPE) (trade name "Sumikasen G201-F" available from Sumitomo Chemical Co., Ltd.; hereinafter, occasionally referred to simply as "LDPE") were mixed well to prepare a nucleated PP composition a1. Also, 100 parts PP resin 4 and 10 parts the LDPE were mixed to prepare a non-nucleated PP composition b1.

By double extrusion (co-extrusion) of these compositions a1 and b1, was prepared a two-layer PP sheet having a layer A formed of the composition a1 and a layer B formed of the composition b1 stacked in the thickness direction. That is, the compositions a1 and b1 are placed in a co-extruder and the melted compositions a1 and b1 were extruded in layers from the T-die of the extruder (at a die temperature of 240° C.) so that the volume ratio of the composition a1 to the composition b1 (a1: b1) was 8 to 1. The extruded material was cooled to form a sheet of 170 μm by feeding the material between a processing roll (cooling roll) with a grooved lattice on the surface and a pressing roll (cooling roll) with a smooth surface. The process of cooling and molding was carried out so that the composition b1 contacted the processing roll and the composition a1 contacted the pressing roll. This gave a two-layer PP sheet (liner substrate) having a support layer formed of the composition a1 and a structured layer (PSA side layer) formed of the composition b1 with a lattice of ridges corresponding the surface structure (grooved lattice) of the processing roll.

Subsequently, the structured layer was coated with a release agent on the surface (the face with the lattice of ridges). For the release agent, a commercially-available addition-curable silicone release agent (containing platinum catalyst) was used. The release agent (solution) was applied to the structured surface of the PP sheet so that the applied amount was about 0.3 to 0.5 g/m$^2$ based on solid content. The release agent was dried and cured at 145° C. for one minute to obtain the release liner of Example 1. The release liner (sample 1) had a total thickness of 170 μm of which the thickness of the support layer was 135 μm. The structured layer constituting the PP sheet had a lattice where perpendicularly-intersecting ridges that were extending widthwise and lengthwise and distributed in the two directions at a pitch of 500 μm. The cross section of each ridge was a trapezoid of 68 μm lower side, 10 μm upper side and 25 μm height.

Example 2

Preparation of Release Liner Sample 2

100 parts PP resin3 and 10 parts the LDPE were mixed well to prepare a non-nucleated PP composition b2. In similar procedures as Example 1 while using the composition b2 in place of the composition b1, was prepared, as release liner sample 2, a two-layer PP sheet having a support layer formed of the composition a1 and a structured layer formed of the composition b2.

Example 3

Preparation of Release Liner Sample 3

100 parts PP resin2 and 10 parts the LDPE were mixed well to prepare a non-nucleated PP composition b3. In similar procedures as Example 1 while using the composition b3 in place of the composition b1, was prepared, as release liner sample 3, a two-layer PP sheet having a support layer formed of the composition a1 and a structured layer formed of the composition b3.

Example 4

Preparation of Release Liner Sample 4

APP sheet in this example was constituted entirely from the non-nucleated PP composition b1 used for the structured layer in Example 1. In particular, the composition b1 was placed into the extruder and extruded at a die temperature of 240° C. The extruded material was cooled and molded in a similar manner as Example 1 to obtain the PP sheet (liner substrate) with a lattice of ridges on one surface. The sheet was thus composed entirely of the composition b1. This PP sheet was release-coated in the same manner as Example 1 to obtain release liner sample 4.

Example 5

Preparation of Release Liner Sample 5

A PP sheet in this example was constituted entirely from the nucleated PP composition a1 used for the support layer in Example 1. In particular, the composition a1 was placed into the extruder and extruded at a die temperature of 240° C. The extruded material was cooled and molded in a similar manner as Example 1 to obtain the PP sheet (liner substrate) with a lattice of ridges on one surface. The sheet was thus composed entirely of the composition a1. This PP sheet was release-coated in the same manner as Example 1 to obtain release liner sample 5.

Example 6

Preparation of Release Liner Sample 6

In this example, a PP sheet was constituted entirely from the nucleated PP composition a1 as described in Example 5 except that the thickness was made to be 200 μm. This PP sheet was release-coated in the same manner as Example 1 to obtain release liner sample 6.

Release liner samples 1 to 6 were analyzed for bending strength, crease retention and heat resistance. The results are shown in Table 2 along with the liner (PP sheet) composition and total thickness of each sample. For comparison, the same analysis was conducted on a paper release liner laminated with polyethylene film on both faces (sample 7, a total thickness of 190 μm) with the results also shown in Table 2.

TABLE 2

| Sample | | 1 | 2 | 3 | 4 | 5 | 6 | 7 |
|---|---|---|---|---|---|---|---|---|
| Substrate constitution | Structured layer | b1 | b2 | b3 | b1 | a1 | a1 | PE/paper/PE |
| | Support layer | a1 | a1 | a1 | | | | |
| Total thickness [μm] | | 170 | 170 | 170 | 170 | 170 | 200 | 190 |
| Bending strength at 90 mm distance [N/50 mm] | 5° C. | 0.60 | 0.58 | 0.57 | 0.57 | 0.64 | 0.20 | 1.23 |
| | 23° C. | 0.48 | 0.44 | 0.43 | 0.40 | 0.59 | 1.00 | 1.00 |
| | 35° C. | 0.43 | 0.40 | 0.38 | 0.32 | 0.54 | 1.00 | 0.90 |
| Crease retention | | 3 | 3 | 3 | 3 | 2 | 1 | 3 |
| Heat resistance during release coating | | ≤4% | ≤4% | ≤4% | >4% | ≤4% | ≤4% | — |

As shown in Table 2, samples 1 to 3 in which the substrate was formed of a layer A (support layer) formed of a nucleated PP composition and a layer B (structured layer) formed of a non-nucleated PP composition exhibited excellent crease retention and heat resistance in release coating process. The bending strength of either of these samples did not significantly decrease as the temperature was increased. In particular, the bending strength at 35° C. was 85% or greater (approximately 90%) of the bending strength at 23° C. From these results, the release liners of samples 1 to 3 all provided easy bending and easy handling (easy attaching operation). Further, these three liners are excellent in recyclability since they are composed of resin materials of the same type (olefin resins).

On the other hand, sample 4 formed solely of a non-nucleated composition showed a low heat resistance in release-coating process and a significant decrease in bending strength with the temperature increase. Sample 5 formed solely of a nucleated PP composition displayed a poor crease retention and the crease retention of sample 6, which had a larger thickness, was even poorer.

The release liners of samples 1-3, 5 and 7 were analyzed for silicone curing efficiency, peel strength of liner and releasing ease as described above. The results are shown in Table 3. The amount of the applied release agent was measured as described above for each sample and the results were: 0.34 g/m² for sample 1, 0.37 g/m² for sample 2, 0.40 g/m² for sample 3, 0.49 g/m² for sample 5, and 0.45 g/m² for sample 7. The amount of the transferred silicone was also measured for each sample as described above and the results were: 0.6 mg/m² for sample 1, 0.9 mg/m² for sample 2, 1.0 mg/m² for sample 3, 1.6 mg/m² for sample 6, and 1.6 mg/m² for sample 7.

TABLE 3

| Sample | | | 1 | 2 | 3 | 5 | 7 |
|---|---|---|---|---|---|---|---|
| Substrate constitution | Structured layer | | b1 | b2 | b3 | a1 | PE/paper/PE |
| | Support layer | | a1 | a1 | a1 | | |
| Total thickness [μm] | | | 170 | 170 | 170 | 170 | 190 |
| Silicone curing efficiency | | | 3 | 2 | 2 | 1 | 1 |
| Peel strength of liner [N/50 mm] | 1 m/min | 5° C. | 0.26 | 0.99 | 0.48 | 0.99 | 0.52 |
| | | 23° C. | 0.79 | 1.25 | 1.43 | 1.76 | 0.56 |
| | | 35° C. | 0.82 | 1.84 | 1.74 | 2.33 | 0.54 |
| | 48 m/min | 5° C. | 0.81 | 1.29 | 1.42 | 1.47 | 1.05 |
| | | 23° C. | 1.03 | 1.53 | 1.63 | 1.79 | 1.35 |
| | | 35° C. | 0.95 | 1.60 | 1.61 | 1.85 | 1.96 |
| Releasing ease | | | 3 | 2 | 2 | 2 | 3 |

As shown in Table 3, sample 1 was superior to samples 2, 3 and 5 in curing (silicone curing) of the silicone release agent. The PSA side layer (structured layer) of sample 1 was formed of the composition b1, which contained a smaller amount of the phosphorous-containing antioxidant as compared to those used for samples 2, 3 and 5. The difference in silicone curing efficiency was reflected on the peel strength and releasing ease of the liner. In particular, the liner of sample 1, which is excellent in silicone curing, provided great releasing ease similarly as the liner of sample 7. Sample 1 also showed an excellent peel strength of 1 N/50 mm even at the high temperature (35° C.).

As described above, the release-lined PSA sheet of the present invention provides a great performance. The release liner to constitute the release-lined PSA sheet comprises PP sheet (polyolefin material). Thus, it can be more easily recycled unlike a release liner containing a paper substrate or the like. This release-lined PSA sheet can be used for various decorative purposes. For instance, it is desirable as a paint alternative, exterior decoration, surface protection and so forth for automobiles. Especially, a paint alternative is desired to provide easy handling to increase production efficiency and also to provide a good performance in a high temperature environment because of the operating temperature can be relatively high (for example, 30° C. to 35° C.) in plants during summer. The application of this release-lined PSA sheet is not limited to manual handling, but it can be used in an attachment apparatus (attachment jig) such that the PSA sheet is adhered to an adherend continuously while released from the liner. The release liner of the present invention can be preferably used for constructing the release-lined PSA sheet described above.

What is claimed is:
1. A pressure-sensitive adhesive sheet with release liner, comprising:
a pressure-sensitive adhesive sheet having a support and a pressure-sensitive adhesive layer retained by the support; and
a release liner placed on the pressure-sensitive adhesive layer, wherein the release liner is formed of a polypropylene resin sheet;
wherein the resin sheet has a layered configuration consisting of:

a layer A formed of a polypropylene resin composition (a) containing a nucleating agent, wherein the polypropylene resin composition (a) comprises a blend of a propylene polymer and a polyethylene, and the content of the polyethylene is 5 to 20 parts by mass with respect to 100 parts by mass of the propylene polymer, and a layer B formed of a propylene resin composition (b) containing no nucleating agent.

2. The pressure-sensitive adhesive sheet with release liner according to claim 1, wherein the resin sheet has the layer B on the side that contacts the pressure-sensitive adhesive layer.

3. The pressure-sensitive adhesive sheet with release liner according to claim 1, wherein either the layers A or the layer B contacts the pressure-sensitive adhesive layer and at least the layer contacting the pressure-sensitive adhesive layer is formed of a polypropylene resin composition containing none or up to 0.01 mass % of a phosphorous-containing antioxidant.

4. The pressure-sensitive adhesive sheet with release liner according to claim 1, wherein at least the surface of the liner that contacts the pressure-sensitive adhesive layer is treated with an addition-curable silicone release agent containing a platinum catalyst.

5. The pressure-sensitive adhesive sheet with release liner according to claim 1, wherein the volume of the layer A is 50% or greater of the volume per unit square of the resin sheet.

6. The pressure-sensitive adhesive sheet with release liner according to claim 1, wherein the release liner has, on the surface that contacts the pressure-sensitive adhesive layer, ridges of 5 µm to 50 µm in height extending in parallel to each other at a pitch of 100 µm to 1000 µm.

7. The pressure-sensitive adhesive sheet with release liner according to claim 2, wherein the propylene polymer contained in the polypropylene resin composition (a) is homopolypropylene, and the polyethylene contained in the polypropylene resin composition (a) is linear low density polyethylene.

8. The pressure-sensitive adhesive sheet with release liner according to claim 7, wherein the polypropylene resin composition (a) contains no polymer components other than propylene polymer and ethylene polymer.

9. The pressure sensitive adhesive sheet with release liner according to claim 2, wherein the polypropylene resin composition (b) comprises a propylene polymer and a polyethylene, and wherein the content of the polyethylene is 5 to 20 parts by mass with respect to 100 parts by mass of the propylene polymer.

10. The pressure-sensitive adhesive sheet with release liner according to claim 9, wherein the propylene polymer contained in the polypropylene resin composition (b) is homopolypropylene, and the polyethylene contained in the polypropylene resin composition (b) is linear low density polyethylene.

11. The pressure-sensitive adhesive sheet with release liner according to claim 9, wherein both the polypropylene resin composition (a) and the polypropylene resin composition (b) contain no polymer components other than propylene polymer and ethylene polymer.

12. A release liner to be placed on a pressure-sensitive adhesive layer of a pressure-sensitive adhesive sheet, wherein the release liner is formed of a polypropylene resin sheet of a layered configuration consisting of:

a layer A formed of a polypropylene resin composition (a) containing a nucleating agent, wherein the polypropylene resin composition (a) comprises a blend of a propylene polymer and a polyethylene, and the content of the polyethylene is 5 to 20 parts by mass with respect to 100 parts by mass of the propylene polymer, and a layer B formed of a propylene resin composition (b) containing no nucleating agent.

13. The release liner to be placed on a pressure-sensitive adhesive layer of a pressure-sensitive adhesive sheet according to claim 12, wherein the propylene polymer contained in the polypropylene resin composition (a) is homopolypropylene, and the polyethylene contained in the polypropylene resin composition (a) is linear low density polyethylene, the polypropylene resin composition (b) comprises a propylene polymer and a polyethylene, wherein the content of the polyethylene is 5 to 20 parts by mass with respect to 100 parts by mass of the propylene polymer, and both the polypropylene resin composition (a) and the polypropylene resin composition (b) contain no polymer components other than propylene polymer and ethylene polymer.

14. The release liner to be placed on a pressure-sensitive adhesive layer of a pressure-sensitive adhesive sheet according to claim 12, wherein the thickness of the resin sheet is 100 µm to 300 µm.

15. The pressure-sensitive adhesive sheet with release liner according to claim 1, wherein the thickness of the resin sheet is 100 µm to 300 µm.

16. A pressure-sensitive adhesive sheet with release liner, comprising:

a pressure-sensitive adhesive sheet having a support and a pressure-sensitive adhesive layer retained by the support; and a release liner placed on the pressure-sensitive adhesive layer, wherein the release liner is formed of a polypropylene resin sheet;

wherein the resin sheet has a layered configuration comprising:

a layer A formed of a polypropylene resin composition (a) containing a nucleating agent, wherein the polypropylene resin composition (a) comprises a blend of a propylene polymer and a polyethylene, and the content of the polyethylene is 5 to 20 parts by mass with respect to 100 parts by mass of the propylene polymer, and a layer B formed of a propylene resin composition (b) containing no nucleating agent, wherein the polypropylene resin composition (a) contains no polymer components other than propylene and ethylene polymer.

17. The pressure-sensitive adhesive sheet with release liner according to claim 16, wherein the thickness of the resin sheet is 100 µm to 300 µm.

* * * * *

UNITED STATES PATENT AND TRADEMARK OFFICE
CERTIFICATE OF CORRECTION

PATENT NO. : 8,486,505 B2
APPLICATION NO. : 12/043569
DATED : July 16, 2013
INVENTOR(S) : Ukei et al.

It is certified that error appears in the above-identified patent and that said Letters Patent is hereby corrected as shown below:

In the Claims:

Claim 1 at column 19, line 7, "propylene" should read --polypropylene--.

Claim 12 at column 20, line 11, "propylene" should read --polypropylene--.

Claim 16 at column 20, line 51, "propylene" should read --polypropylene--.

Claim 16 at column 20, line 54, "propylene" should read --polypropylene--.

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,486,505 B2 | Page 1 of 1 |
| APPLICATION NO. | : 12/043569 | |
| DATED | : July 16, 2013 | |
| INVENTOR(S) | : Ukei et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this
Fourteenth Day of April, 2015

Michelle K. Lee
*Director of the United States Patent and Trademark Office*